July 15, 1969 G. TWELE 3,455,112
INSTALLATION FOR PROTECTING SURF-ENDANGERED COASTAL SECTORS
Filed June 6, 1966 3 Sheets-Sheet 1
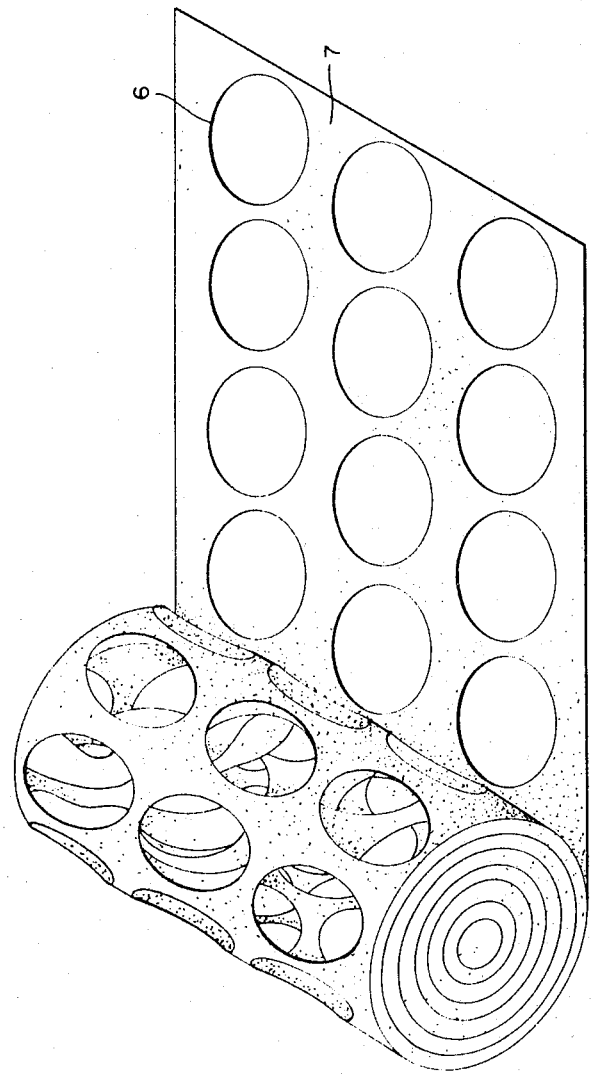
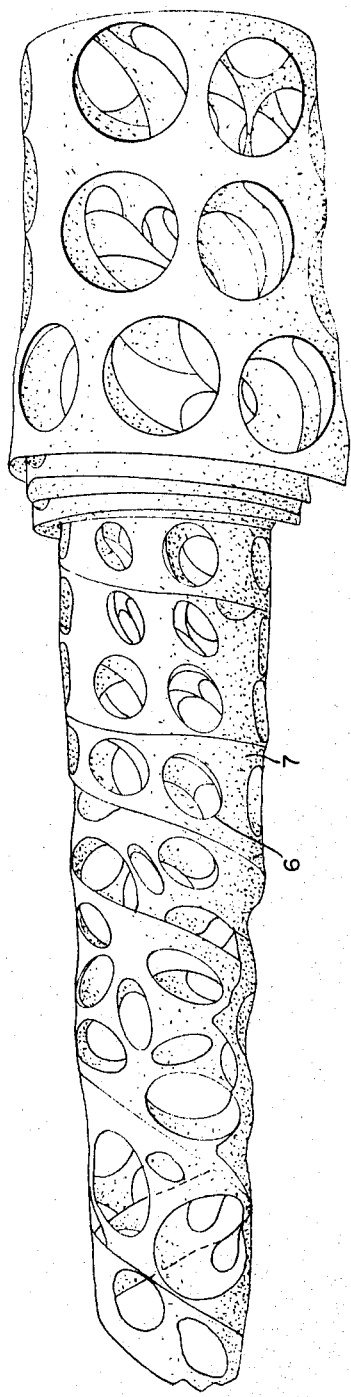
INVENTOR.
GÜNTHER TWELE
BY
ATTORNEY

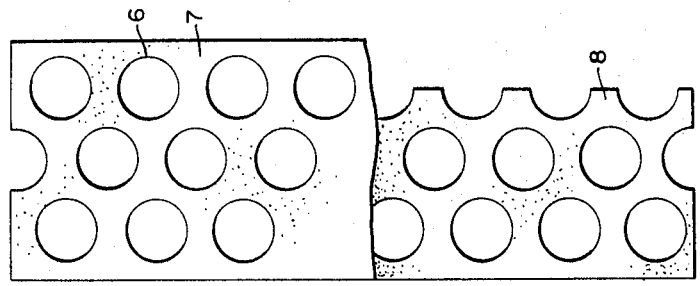
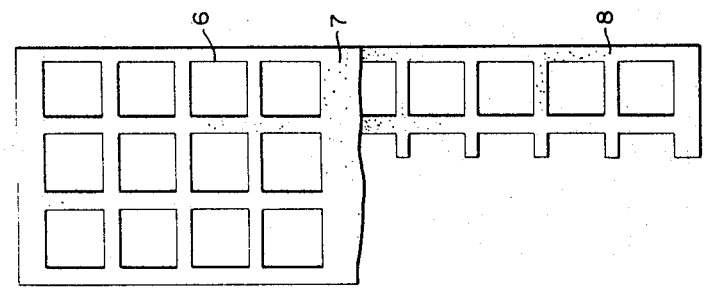
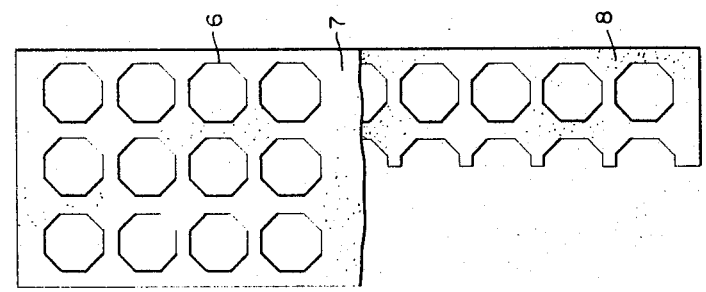
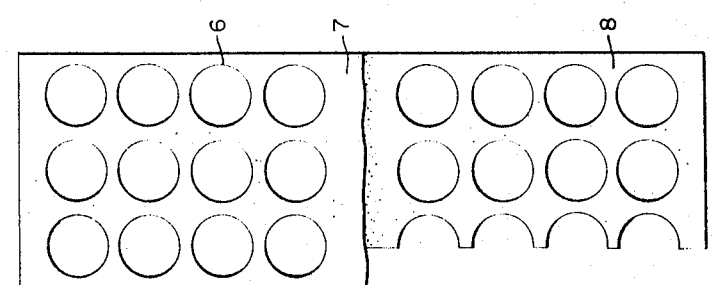

July 15, 1969     G. TWELE     3,455,112
INSTALLATION FOR PROTECTING SURF-ENDANGERED COASTAL SECTORS
Filed June 6, 1966     3 Sheets-Sheet 3

INVENTOR.
GÜNTHER TWELE
BY
*James E. Bryan*
ATTORNEY

United States Patent Office 3,455,112
Patented July 15, 1969

3,455,112
INSTALLATION FOR PROTECTING SURF-ENDANGERED COASTAL SECTORS
Gunther Twele, Wiesbaden, Germany, assignor to Kalle Aktiengesellschaft, Wiesbaden-Biebrich, Germany
Filed June 6, 1966, Ser. No. 556,809
Int. Cl. E02b 3/04
U.S. Cl. 61—3                      4 Claims

ABSTRACT OF THE DISCLOSURE

This invention relates to a method for protecting surf-endangered coastal sectors which comprises covering endangered portions of a coast with loosely combined felted strips of plastic material and anchoring the material to the coast.

---

Figure 4:
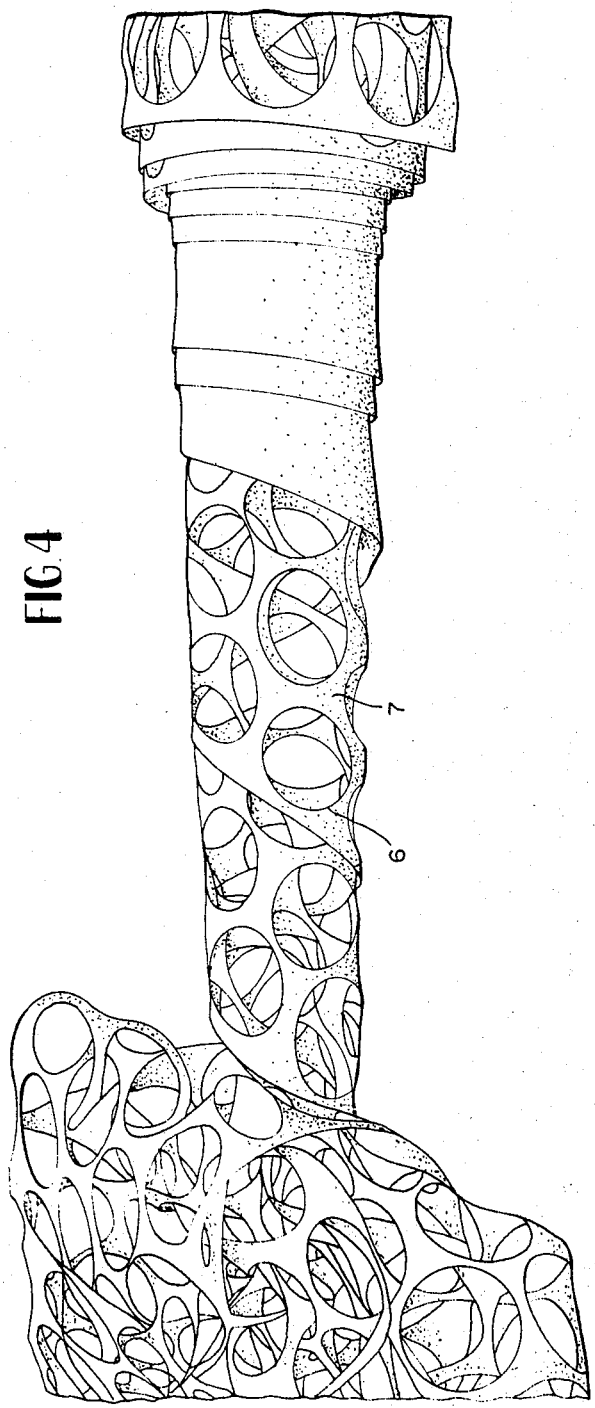

This invention relates to a method for protecting coastal sectors, especially sand beaches, which are endangered by surf.

It is known that coastal sectors which are overgrown with seaweed are adversely affected by surf to a far smaller extent than those without seaweed. Accordingly, it has been attempted to replace the natural seaweed by strips of plastic film, which are bundled and weighted at one end, and anchored to the endangered coastal sector. These ribbons of plastic film rise in the water at flood tide and lie down onto the soil at ebb tide if the coastal sector is not inundated by water. It has been shown, however, that the protection provided by this "artificial seaweed" is not sufficient since coastal sectors so protected are adversely affected by surf, although slowly. Furthermore, the manufacture and anchoring of such materials are comparatively complicated.

The present invention provides a method and a material which afford a better protection for the endangered coastal sectors.

The method of the present invention comprises covering the endangered portions of the coast with loosely combined felted strips of plastic material and anchoring the lining components at several points, if required, in connection with each other by means of wires passing over the lining.

Suitable loosely combined strips of plastic material are, for example, strips of plastic film which are arranged irregularly to each other and felted to form loose bales. Particularly advantageous is the use of residual film webs resulting from the manufacture of articles by the deep-drawing process in which the articles are punched out of the film leaving a correspondingly perforated web. These residual webs either may be cut along the holes to form strips which are then arranged in an irregular non-oriented position, or used in a manner such that a roll consisting of the perforated film web is gripped at the inner and the outer ends and laterally extended to form a spirally wound object. Particularly the first-mentioned method in which the perforated film webs are cut along the holes and the strips obtained are arranged in an irregular non-oriented position with respect to each other provides a lining which has good cohesive properties and is particularly suitable for dissipating the energy of rolling waves.

The anchoring of the protective linings of the present invention may be performed by means of piles and also by weighting with stones and the like. In the latter case it is also possible to connect the stones by means of wires made from a corrosion-resistant material, e.g. plastic wires, to form a wide-meshed net which is extended over the lining.

The material of the present invention provides an excellent protection for surf-endangered coastal sectors. A lining once applied is very durable without maintenance, since it consists of a corrosion-resistant material. Furthermore, the present invention provides an advantageous utilization of film waste.

Figure 5:
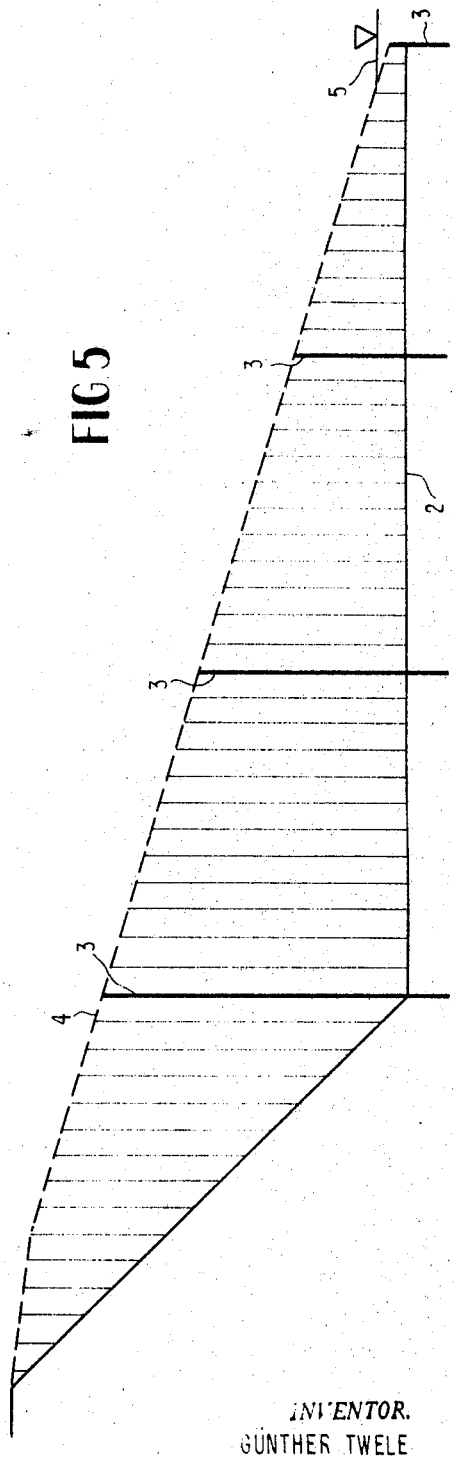

The invention will be further illustrated by reference to the accompanying drawings in which:

FIGURE 1 shows a partially unwound plastic film web provided with apertures therein, FIGURES 2a, 2b, 2c, and 2d show various forms of the apertures which may be in the plastic film of FIGURE 1, FIGURE 3 shows a part of a plastic lining of the invention in a spirally extended condition, FIGURE 4 shows a voluminous, bulky form of the plastic film web, and FIGURE 5 is a diagrammatic side elevation of the lining, manufactured according to the present invention, in use.

The felted plastic material is, as shown in FIGURE 5, applied to the steep and then horizontal surface of the earth 2 and covered with a wire netting 4 which is secured to the piles 3, which latter are anchored in the ground. The level of the water adjacent the shore line is indicated at 5.

Plastic film webs, as shown in the drawings, may be used in any width and advantageously are employed in widths of 10 to 100 centimeters. Because of the speed at which the plastic film webs can be processed to form the lining of the present invention, such webs having widths of 30 to 40 centimeters are preferred, from a practical standpoint.

The openings 6 in the plastic film webs 7, shown in FIGURES 1 to 4 of the drawings, may be of any shape, for example, they may be round or angular or irregular, as shown in FIGURES 2a-d. The openings or apertures should have areas in the range of 2 to 300 square centimeters, preferably from 3 to 100 square centimeters. The number of openings in the plastic film webs may be distributed at random. A regular arrangement is preferred in which the openings constitute 60 to 80 percent, preferably 75 percent of the surface of the film web.

As noted above, particularly advantageous is the use of residual film webs resulting from the manufacture of articles by the deep-drawing process in which the articles are punched out of the film leaving a correspondingly perforated web. These residual webs either may be cut along the holes to form strips 8 which are then arranged in an irregular non-oriented position with respect to each other as shown in FIGURES 2a-d, or employed in a manner such that a roll consisting of the perforated film web is gripped at the inner and the outer ends and laterally extended to form a spirally wound object, as shown in FIGURE 3. The strips 8 in FIGURES 2a-d show one end of a roll of material pulled out and cut along the holes, as described above. The plastic film webs forming the lining may be welded together by the usual welding processes.

The plastic film webs are arranged in a manner such that they form a lining having a thickness of 10 to 300 centimeters, preferably 50 to 150 centimeters. The length and the width of the linings depend on the surface to be covered, which generally is not longer than 5 kilometers and not wider than 25 meters, although it is possible to cover larger surfaces, if desired.

It will be obvious to those skilled in the art that many modifications may be made within the scope of the present invention without departing from the spirit thereof, and the invention includes all such modifications.

What is claimed is:

1. An installation for protecting surf-endangered coastal sectors which comprises a covering composed of loosely combined strips of perforated plastic film which are irregularly oriented and felted to form bales, and means for anchoring said bales to the coast.

2. An article according to claim 1 in which the anchoring means includes a plurality of wires passing over the covering.

3. An article according to claim 1 in which the anchoring means includes piles.

4. An article according to claim 1 in which the anchoring means includes weighting means.

References Cited

UNITED STATES PATENTS

| | | | |
|---|---|---|---|
| 465,968 | 12/1891 | Neale | 61—37 |
| 600,467 | 3/1898 | Wilkinson | 61—37 |
| 3,299,640 | 1/1967 | Nielsen | 61—3 |
| 3,344,609 | 10/1967 | Greiser | 61—38 |

FOREIGN PATENTS

| | | |
|---|---|---|
| 155,204 | 10/1904 | Germany. |
| 984,077 | 2/1965 | Great Britain. |

EARL J. WITMER, Primary Examiner

U.S. Cl. X.R.

61—37